May 3, 1932. W. E. CRAWFORD 1,857,115
ELECTRICAL WELDING APPARATUS
Filed Sept. 17, 1928  2 Sheets-Sheet 1

INVENTOR.
WILLIAM E. CRAWFORD
BY
W. F. Woolard
ATTORNEY.

May 3, 1932.  W. E. CRAWFORD  1,857,115
ELECTRICAL WELDING APPARATUS
Filed Sept. 17, 1928  2 Sheets-Sheet 2
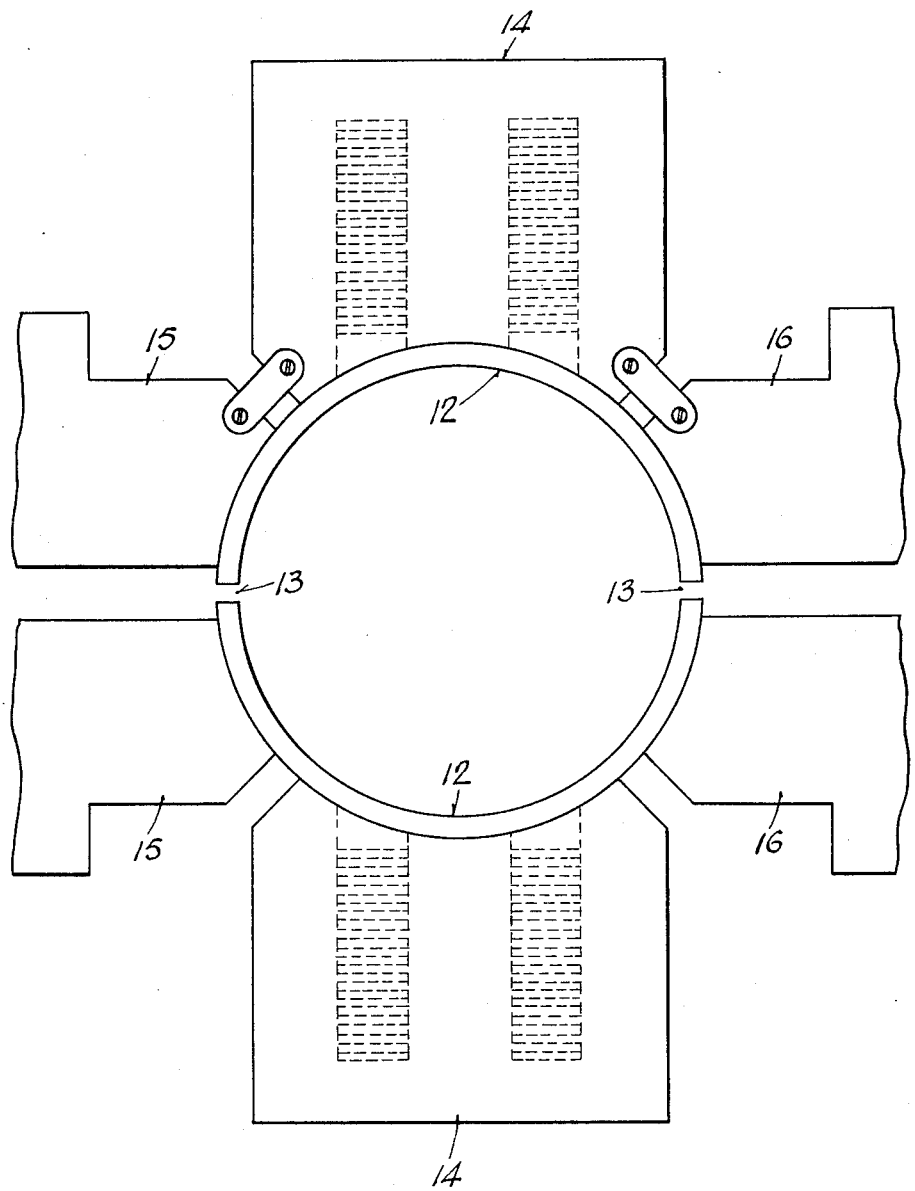
INVENTOR.
WILLIAM E. CRAWFORD
BY
W. F. Woolard
ATTORNEY.

Patented May 3, 1932

1,857,115

UNITED STATES PATENT OFFICE

WILLIAM E. CRAWFORD, OF WAUWATOSA, WISCONSIN, ASSIGNOR TO A. O. SMITH CORPORATION, OF MILWAUKEE, WISCONSIN, A CORPORATION OF NEW YORK

ELECTRICAL WELDING APPARATUS

Application filed September 17, 1923. Serial No. 306,421.

This invention relates to electrical welding apparatus.

The invention particularly relates to an apparatus for flash welding the longitudinal seams of pipe, although it may be applied to various kinds of electrical welding.

In the welding of tubular structures, such as pipe, it has heretofore been necessary to employ mandrels or braces inside the pipe to control the opening of the seams during the welding or to hold the pipe from deformation due to the high pressure contact of the electrodes therewith.

The employment of these interior mandrels and braces has many disadvantages, and is extremely difficult from a production standpoint where the pipe to be welded is long, or small in diameter.

The object of my present invention is to obviate the necessity of interior mandrels and braces inside the pipe.

Another object is to provide an apparatus which is simple and efficient to operate and which will weld a long seam substantially instantaneously.

According to my invention, in its principal phase, the apparatus has means outside of the pipe to control the opening of the seam during the welding operation.

In another phase, the invention contemplates employing means adjacent to but separate from the electrodes to hold the pipe against the pressure applied by the electrodes and thereby prevent deformation of the pipe.

The means thus provided by the invention may be embodied in the form of magnets arranged on opposite sides of the seam to be welded to hold the pipe and control the opening of the seam.

The accompanying drawings illustrate an apparatus made in accordance with the invention and the views of the drawings are as follows:

Fig. 2 is a similar view of a modified form of apparatus.

Figure 1

Figure 1:
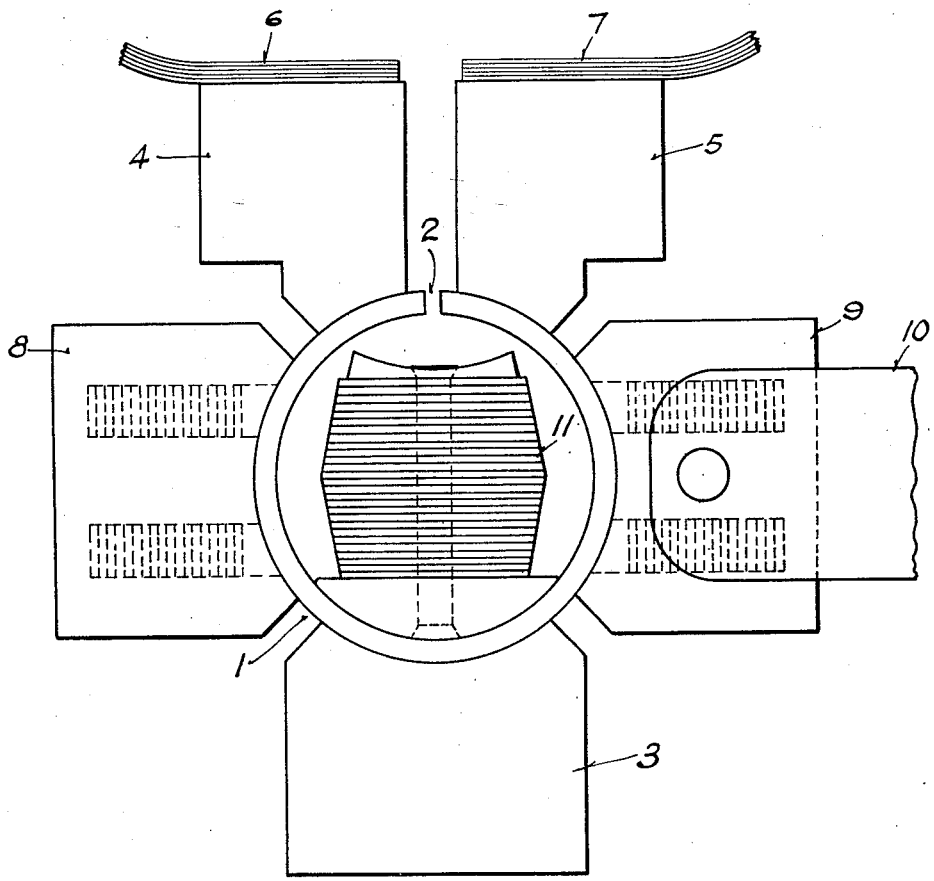
Figure 1 is a diagrammatical end elevation of the apparatus.

The pipe 1 is formed from a single sheet of metal which is curved until the side edges thereof are in abutting alignment to provide a longitudinal seam 2 to be welded.

The pipe rests horizontally on a supporting block 3 so that the seam 2 is uppermost.

Electrode contact blocks 4 and 5 are arranged on opposite sides of the seam and pressed into contact with the pipe adjacent the seam to conduct the welding current thereto. These electrodes are relatively movable toward and away from each other so that the opening at the seam may be varied during the welding operation without disturbing the electrical contact between the electrode and the pipe.

The electrodes are connected to a suitable source of welding current by conductors 6 and 7, respectively.

The opening at the seam is controlled by electro-magnets 8 and 9 arranged on opposite sides of the pipe. These magnets have concave pole faces to receive the sides of the pipe and hold the same from deformation. The magnets are arranged adjacent to the electrodes and hold the pipe against the pressure applied by said electrodes to provide a high pressure contact between the electrodes and the pipe.

The magnets 8 and 9 preferably are arranged separate from the electrodes 4 and 5 in order to prevent demagnetization due to the flux set up by the alternating welding current flowing through the electrodes. The core 11 further tends to prevent undue heating of the metal of the blank which heating might otherwise affect the magnetization of the blank and thus prevent the functioning of the magnets 8 and 9.

Where the apparatus is used to flash weld the seam, the magnets are employed to deflect the sides of the pipe to provide a gap at the seam for the flashing of an arc therealong and then to press the sides together to close the seam and weld the same simultaneously throughout its entire length.

The magnet 9 has a movable support 10 to move the same toward or away from the magnet 8, but any suitable means to produce relative movement between the magnets may be provided.

The support 3, the electrodes 4 and 5, and the magnets 8 and 9 cooperate to enclose substantially the entire outer surface of the pipe to hold the pipe from deformation during the welding operation.

The several parts of the apparatus may extend the entire length of the pipe section to be welded, or they may be spaced at suitable intervals along the same.

The apparatus thus provided may be employed to weld seam 2 in several different ways, although I prefer to use it to flash weld the seam. In this method a gap is provided at the seam and an arc is momentarily flashed across the same for the entire length of the pipe to heat the edges to welding temperature. The seam is then closed under pressure to weld the same.

Leakage of current around the closed back of the pipe may be prevented by the insertion of a soft iron core 11 inside the pipe as more fully set forth and claimed in my copending application, Serial No. 264,633, filed March 26, 1928.

*Figure 2*

The apparatus here shown is adapted to flash or butt weld pipe formed from longitudinal sections 12 having abutting edges which provide a plurality of longitudinal seams 13 to be welded. These seams may be welded simultaneously by employing magnets 14 to hold the pipe sections in place and to control the opening of the seams therebetween.

Separate welding currents may be supplied to the seams by separate sets of electrodes 15 and 16.

The invention herein set forth and hereinafter defined in the claims may have various modifications and adaptations.

Having thus described my invention, what I claim and desire to secure by Letters Patent of the United States, is:

1. In apparatus for welding longitudinal seams in tubular blanks having spaced edges, in combination, electrodes for engaging the walls of the blank near the spaced edges, means cooperative with the electrodes for exerting pressure on the blank, and means external to the blank for exerting a pull on the opposite side walls of the blank to maintain positive and fixed engagement between the electrodes and the blank while the edges are separated during the welding operation.

2. In apparatus for welding longitudinal seams in tubular blanks having spaced edges, in combination, electrodes for engaging the walls of the blank near the spaced edges, means for supporting the blank and to cooperate with the electrodes for exerting pressure on the blank, and means external to the blank for exerting a pull on the walls of the blank to draw them against the electrodes to prevent relative movement between the faces of the electrodes and the engaged portions of the blank walls while the edges are separated during the performance of a welding operation.

3. In apparatus for welding longitudinal seams in tubular blanks having spaced edges, in combination, electrodes for engaging the walls of the blank near the spaced edges, means cooperative with the electrodes for exerting pressure on the blank, means disposed to confine the walls of the blank to support them against distortion during the application of electrode pressure, and means for exerting a force on the walls of the blank to hold them against the confining means and the faces of the electrodes to prevent relative movement between the faces of the electrodes and the portions of the walls of the blank engaged thereby while the edges are separated during the performance of the welding operation.

4. In apparatus for welding longitudinal seams in tubular blanks having spaced edges, in combination, electrodes for engaging the walls of a blank near the spaced edges to provide contact with the blank for establishing a welding circuit and applying a welding voltage across the spaced edges of the blank, means for supporting the blank, the supporting means being disposed to cooperate with the electrodes to apply an electrode pressure to the blank, electro-magnets for exerting a pull on the side walls of the blank to maintain the faces of the electrodes and the portions of the blank engaged thereby in contact and to prevent slipping therebetween during a welding operation, said electro-magnets being disposed at a distance from the electrodes whereby said magnets are substantially unaffected by current flowing in the welding circuit.

5. In apparatus for welding longitudinal seams in pipe, in combination, means for supporting the pipe, relatively movable electrodes disposed to engage the walls of the pipe on opposite sides of the seam to apply a welding potential thereto, electro-magnets oppositely disposed to engage the pipe walls at a distance from the electrodes whereby said magnets are substantially unaffected by the magnetic field caused by current flowing in the welding circuit, and means for moving the electro-magnets relative to one another to control the gap between the edges of the pipe during the flashing period and thereafter to apply the desired welding pressure to the edges.

6. In an apparatus for electric flash welding a longitudinal seam in a tubular article, electrodes arranged to be applied to the blank on opposite sides of the seam to conduct the welding current thereto, means to support the blank on the side opposite said electrodes, means to apply welding pressure to the opposite sides of the blank, and means cooperating with said pressure applying means for preventing collapse of the side walls of the blank under the electrode pressure during the flashing period.

In testimony whereof, I have signed my name at Milwaukee, this 14th day of Sept., 1928.

WILLIAM E. CRAWFORD.